Aug. 25, 1959
H. P. HART
2,901,264
DUAL FRONT AXLE SUSPENSION MEANS AND
STEERING MECHANISM THEREFOR
Filed Jan. 15, 1958
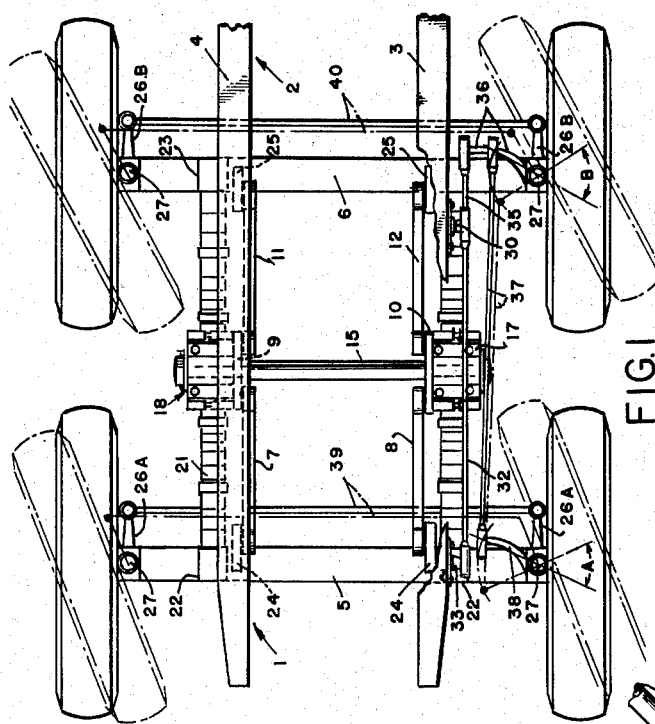
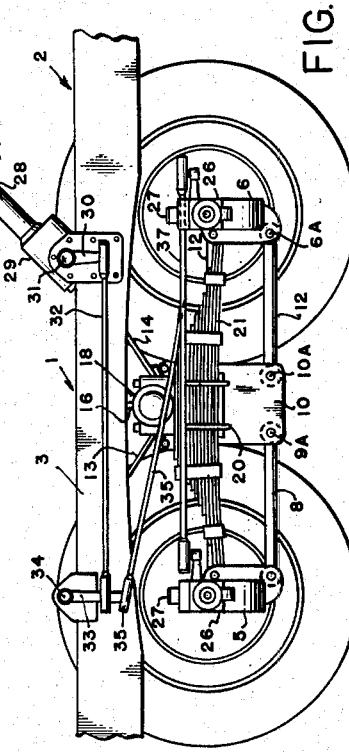
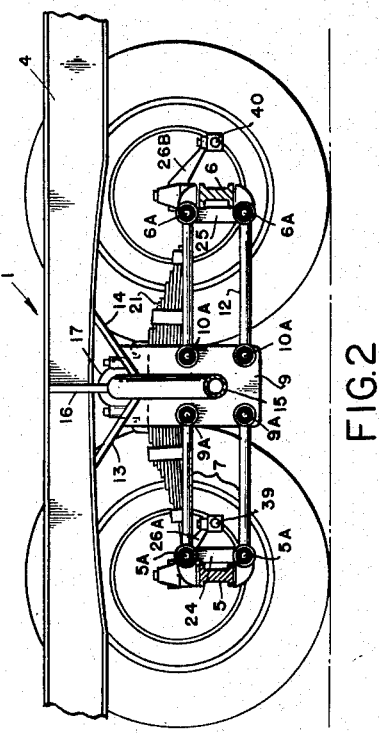
HAROLD P. HART
*INVENTOR.*
BY *James L. Girman*
ATT'Y ced Aug. 25, 1959

2,901,264

DUAL FRONT AXLE SUSPENSION MEANS AND STEERING MECHANISM THEREFOR

Harold P. Hart, Coquille, Oreg.

Application January 15, 1958, Serial No. 709,116

1 Claim. (Cl. 280—91)

This invention relates generally to motor vehicles and more particularly to improvements in the construction of the front end of heavy duty vehicles such as trucks and the like and to improvements in the steering mechanism for such vehicles.

Operators of heavy duty vehicles used in interstate commerce, such as freight trucks, logging trucks, vans and passenger busses, have a problem in complying with the various regulations of different states with respect to load per axle, length of wheel base, and the like. Builders of such vehicles have the problem of producing a vehicle which will conform to the regulations of as many states as possible.

Accordingly it is one of the principal objects of the present invention to provide a motor vehicle wherein the distribution of the load per axle may be so made as to comply with the requirements of the majority of states and yet at the same time facilitate the steering of the vehicle.

Another object of the invention is the provision of a heavy duty vehicle wherein the load at the front end is divided between two tandem axle assemblies including steerable supporting wheels.

A further object is to provide a commercially practical steering mechanism which is of simple, efficient, durable and economical construction involving relatively few parts and capable of being readily assembled in operative relation to tandemly arranged wheels to simultaneously steer both sets of wheels from a common control.

A still further object is to provide steering mechanism for tandem wheels embodying a geometrical arrangement capable of relatively wide steering radius without appreciable scuffing of tires on the road surface.

The foregoing objects and other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a fragmentary top plan view of the front end portion of a vehicle.

Figure 2 is a sectional side elevational view taken approximately along the line 2—2 of Figure 1.

Figure 3 is a side elevational view of Figure 1 with two of the wheels removed for clearness of illustration.

With continuing reference to the drawing, reference numeral 1 indicates generally the front end portion of a vehicle having a frame 2 comprising two frame members 3 and 4 secured in lateral relationship in the conventional manner. The frame 2 is supported on a set of front axles 5 and 6 extending transversely of the frame members beneath the latter and spaced from each other longitudinally of the frame.

The front axle 5 of the set is connected by two sets of torque rods 7 and 8 to a pair of vertically depending plates 9 and 10. The rear axle 6 of the set is also connected to the plates 9 and 10 by two sets of torque rods 11 and 12. The top end of each plate is secured as by welding to a pair of diagonally arranged bracket plates 13 and 14, respectively, which are secured as by welding to the underside of the frame members 3 and 4. A trunnion cross shaft 15 is welded near its opposite ends to the bracket plates 13 and 14 and also to vertical bracket plates 16 secured as by welding to the frame members 3 and 4. The ends of the cross shaft extend laterally from the vertical plates 9 and 10 and terminate within bearing blocks 17 and 18 secured by U-bolts 20 to a pair of semi-elliptical leaf springs 21. The front and rear ends of the springs are slidably attached, respectively, to the corresponding axles 5 and 6 by means of shackles 22 and 23. Thus the load applied to the front end portion of the vehicle is equally distributed between the front and rear axle assemblies 5 and 6.

The forward ends of the torque rods 7 and 8 are connected by rubber bushed pivot pins 5A to brackets 24 secured as by welding to the front axle and the opposite ends of the torque rods 7 and 8 are connected to the plates 9 and 10 by rubber bushed pivot pins 9A. The torque rods 11 and 12 are similarly connected to the rear axle 6 by means of rubber bushed pivot pins 6A carried by brackets 25 and connected at their opposite ends to the plates 9 and 10 by rubber bushed pivot pins 10A. The axles are thus linked together for maximum strength by the torque rods which also absorb operational torque reactions.

A ground engaging wheel is supported at each axle end, and a conventional steering knuckle 26 is provided for this purpose. In accordance with conventional practice, the steering knuckles are respectively pivotally connected to the axle ends by a king pin 27 having its axis inclined relative to the vertical to provide the desired caster angle or steering knuckle-pivot rake.

In the present invention, the ground engaging wheels connected to the front axle and the ground engaging wheels connected to the rear axle may be turned simultaneously by manipulating a common steering control 28. The control forms a part of a conventional type of steering gear mechanism comprising a housing 29 for the gearing (not shown) and a steering arm 30 connected to the gearing by a shaft 31. The steering gear mechanism is supported on the left-hand side of the vehicle frame 1 just forward of the rear axle 6. The swinging or lower end of the steering arm 30 is connected to one end of a link 32 whose opposite end is connected to an arm 33 pivotally supported on the frame 1 by a pin 34 forwardly of the steering arm 30 and at a point in vertical alignment with the front axle 5. Also connected to the arm 33 is one end of a drag-link 35 whose opposite end is connected to an arm 36 integrated with the left rear steering knuckle 26. This arm is connected by a tie-rod 37 to a companion arm 38 integrated with the left front steering knuckle 26. All four knuckles are provided with second arms 26A and 26B by means of which the two forward knuckles are interconnected respectively with a tie-rod 39 and the rear knuckles by a tie-rod 40.

From the foregoing it will be apparent that rocking movement of the steering arm 30 by the steering mechanism will impart turning moment to the left-hand front and rear ground engaging wheels and that the turning moment will be transferred to the right-hand wheels by the tie-rods 39 and 40. In practice, it is desirable to turn the front ground engaging wheels throughout a lesser angle (A) or radius than the rear ground engaging wheels (angle B) in order to reduce scuffing of the tires on the road surface. The geometry of the steering linkage shown in the drawing, somewhat exaggerated for clearness, is predetermined to obtain the above result. In detail it will be noted that this is accomplished through the greater turning moment of the rearward end of the fore and aft tie-rod 37 than the forward end thereof as indicated by the angles A and B as aforesaid.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

A front end construction for vehicles comprising a frame, front and rear axles extending transversely of the frame in tandem relationship and provided with steering knuckles at opposite ends thereof, a pair of spaced apart vertically disposed brackets permanently secured to and extending above and below said axles, a pair of semi-elliptical leaf springs slidably bearing at their ends on said axles and each provided with a superimposed bearing block intermediate its ends, a plate secured to and depending from each of the opposite sides of said frame, a trunnion cross shaft secured to and extending through said plates and journalled at their ends in said bearing blocks, two sets of upper and lower parallel torque rods pivotally attached at one of their ends to said plates below said springs and at their opposite ends to said brackets, a steerable ground engaging wheel journalled on each of said knuckles, steering gear mechanism secured to the frame between said front and rear axles and including a first arm supported at one side of said frame for rocking movement, a second arm pivotally supported on the frame on the same side thereof as the steering mechanism and at a point in vertical alignment with said front axle, a link interconnecting said first and second arms, a draglink of greater length than said link connecting said second arm with an arm integrated with the steering knuckle at one end of said rear axle, a tie-rod interconnecting the last mentioned arm at a point intermediate its ends with the outermost end of a companion arm integrated with the steering knuckle at the corresponding end of said front axle, and tie rods interconnecting the steering knuckles at opposite ends of each axle, whereby rocking movement of said first and second arms will impart turning moment to the rear ground engaging wheels on a greater radius than that imparted to the front ground engaging wheels.

References Cited in the file of this patent
UNITED STATES PATENTS

| | | |
|---|---|---|
| 1,436,031 | Furlong | Nov. 21, 1922 |
| 2,323,669 | Murty et al. | July 6, 1943 |
| 2,633,204 | Keller | Mar. 31, 1953 |